C. OLDS.
Seed-Planter.
No. 1,933.
Patented Jan. 20, 1841.
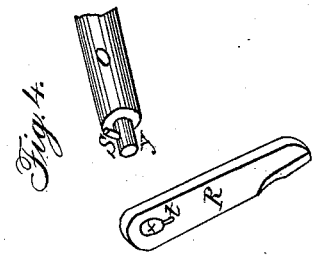
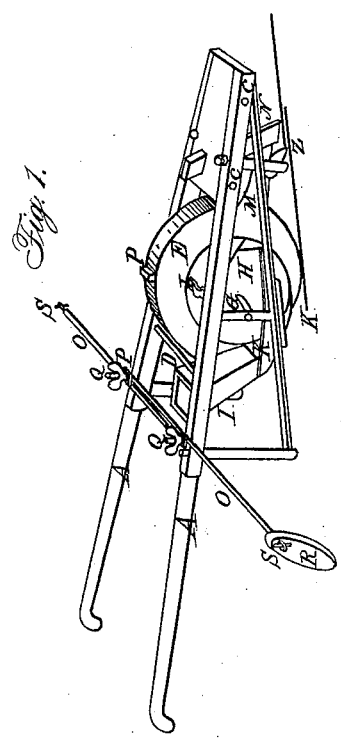
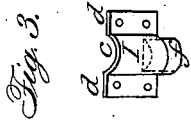
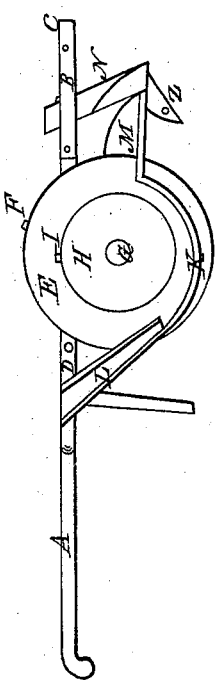

UNITED STATES PATENT OFFICE.

CALVIN OLDS, OF MARLBOROUGH, VERMONT.

IMPROVEMENT IN SEED-DRILLS AND CORN-PLANTERS.

Specification forming part of Letters Patent No. 1,933, dated January 20, 1841.

*To all whom it may concern:*

Be it known that I, CALVIN OLDS, of the town of Marlborough, county of Windham, and State of Vermont, have invented a new and useful Machine for Planting Corn, Beans, Peas, Seeds, &c., which is described as follows, reference being had to the annexed drawings of the same, making part of this specification.

Figure 1 is a perspective view of the machine. Fig. 2 is a sectional view through the center of the dropping-wheel, hopper, shoe, and conductor; Fig. 3, the bucket with a movable bottom; Fig. 4, section showing the end of one of the arms with the pin therein, and the drag perforated with a round aperture and an oblong slot running into said aperture.

Similar letters refer to similar parts in the figures.

This machine resembles the common wheelbarrow, except in the particulars hereinafter stated. It has two long shafts, A A, made and arranged like those of the wheel-barrow, except that they are extended beyond the axle of the wheel to receive a drilling apparatus, having blocks of wood B placed between the ends of the shaft nearest together, and having horizontal transverse parallel screw-bolts *c* passing through them for securing the drills and coverers and allowing the blocks to be loosened, so as to regulate them, and for securing the shafts. There are also one or more cross-bars, D, passed through the shaft behind the wheels for bracing them. Between these shafts is placed a wheel, E, whose circumference is in length equal to the distance apart that the corn is desired to be planted—say about three feet six inches. It may, however, be greater or smaller, as desired, according to the kind of planting required; but for planting corn it may be, as before stated, about forty-two inches in circumference, having a stamp or block, F, fixed on its periphery to mark the hills, and is fixed to an axle, G, which turns in two hanging posts projecting down from the under side of the shafts. This wheel performs the double office of carrying the machine and marking the hills when the grain is dropped. Another wheel, H, of smaller diameter than the marking-wheel, called the "dropping-wheel," is placed on the axle G of said marking-wheel and by the side of it, having on its periphery a bucket, I, which, as the wheel revolves, takes the corn from a shoe, K, at the bottom of the hopper L, containing the corn to be planted, and drops it into a spout, M, which conducts it to the furrow made by a hollow tooth or drill, N, placed directly in front of the spout and marking-wheel. This wheel is made movable on the axle of the large wheel for the purpose of adjusting the position of the bucket I to the stamp or marker F, and yet it is not to be so loose on the shaft as to turn without the application of considerable power. The wheels, however, when adjusted, may be connected together by a screw or pin.

A shoe, K, for receiving and containing the corn is placed and secured below the dropping-wheel H, at such a distance from it as to permit the bucket on its periphery to pass through the corn in said shoe freely and take up the required quantity without any crowding or impediment, and should be somewhat wider than the thickness of the wheel, and it should form an inclined plane at the rear part, and curve upward at the front part to prevent the escape of the corn. The corn is conducted to the shoe through a hopper, L, like that of a grist-mill, which is secured to one of the shafts directly behind the dropping-wheel.

A spout or conductor, M, for conveying the corn to the furrow made by the drill N, is placed and secured to the frame of the machine directly in front of the dropping-wheel in an inclined position, the higher end being below the axle of the dropping-wheel, and as far from its periphery as to allow the bucket to pass it without touching, and its lower end placed in the concavity of the drill, near the ground.

The drill N and coverers Z may be made in the usual or most approved manner.

Two parallel arms or rods, *o*, are secured to the shafts A by clamp-plates P and thumb-screws Q, extending to the right and left as far as the rows are required to be apart, each arm having a round neck turned on it at its outer extremity, to which is hung a drag, R, for marking for the rows, secured thereon by a pin, S, Fig. 4, inserted into the arm at an angle of about forty or fifty degrees with the horizon, the drag R being put on the arm by having an oblong slot, *t*, running into the round aperture X, so as to allow it to be passed over the small end *y* of the arm Q and over the pin S therein, that the drag R may be put on and taken off easily without removing the pins. The arms O are made movable to the right and left for the purpose of marking the various widths of rows required by means of the plates and screws.

The bucket L, Fig. 3, for taking up the corn is made of a flat piece of tin or other substance bent so as to form a segment of a circle, c, having its sides d d turned back, forming flanges, for securing it to the periphery of the wheel H. It is open at both ends, having a stopper, f, inserted at one end, made movable in the bucket for increasing or diminishing the size of the bucket according to the number of grains of corn to be taken up for each hill.

Operation: The corn to be planted is put into the hopper L, from whence it descends into the shoe K. The operator takes hold of the handles of the shafts A and moves the machine forward. The marking-wheel E turns on the ground, and at the same time turns the dropping-wheel H, placed on the same axle, a. This takes up the corn from the shoe and drops it into the spout M, which conducts it to the furrow made by the drill N and directly behind it. The coverers Z throw back the earth into the furrow, and thus cover the corn, over which the marking-wheel passes, the stamp F marking the hills at the same time the drag R marks for the next furrow. In returning the drag must be shifted to the opposite arm O.

To regulate the machine so as to cause the marking-wheel E to stamp where the hill is, first turn the side scrapers or coverers, Z, out of the way, or in a line with the movement of the machine, so as not to cover the corn. Then commence the operation of adjusting by walking forward at a natural gait in an upright and natural position. When you shall have proceeded the distance of a few hills, stop and draw the machine back again in its own track to the last hill but one that was dropped, and let the large wheel E stand directly over the corn. Then with a piece of chalk make a mark on the lower edge of the small or dropping wheel H, directly over the corn. Then turn the small wheel so that the mark you made on it shall come in a line radiating from the center G to the stamp F in the large wheel. Then as the wheel revolves the stamp F will show where the hills are. Then fix the coverers Z in their proper positions, and the machine is ready for operation.

This machine may be easily adapted for planting various kinds of large and small seeds and grain by simply furnishing the dropping-wheel with the requisite number and size of buckets. This principle of planting may be carried out on a large scale, and propelled by horse or other power, any required number of wheels, axles, shoes, spouts, drills, &c., being arranged in a suitable frame, either by itself or connected to a harrow.

What I claim as my invention, and desire to secure by Letters Patent, consists in—

The arrangement of the cup-wheel on the axle of the large wheel E, so as to render it adjustable, as before described.

CALVIN OLDS.

Witnesses:
 RUFUS MATHER,
 C. T. ALVORD.